US011550840B2

(12) United States Patent
Accardo et al.

(10) Patent No.: US 11,550,840 B2
(45) Date of Patent: Jan. 10, 2023

(54) METHOD AND SYSTEM FOR GENERATING A VISUAL REPRESENTATION OF MEDIA CONTENT FOR PERFORMING GRAPH-BASED MEDIA CONTENT EVALUATION

(71) Applicant: Disney Enterprises, Inc., Burbank, CA (US)

(72) Inventors: Anthony M. Accardo, Los Angeles, CA (US); Grace Lu, Hudson, OH (US); Avner Swerdlow, Los Angeles, CA (US); Katharine Ettinger, Santa Monica, CA (US); Alexis J. Lindquist, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 166 days.

(21) Appl. No.: 15/654,607

(22) Filed: Jul. 19, 2017

(65) Prior Publication Data
US 2019/0026315 A1  Jan. 24, 2019

(51) Int. Cl.
| G06F 16/53 | (2019.01) |
| G06F 16/43 | (2019.01) |
| G06F 16/48 | (2019.01) |
| G06F 16/532 | (2019.01) |
| G06F 3/048 | (2013.01) |
| G06Q 10/10 | (2012.01) |
| G06F 16/438 | (2019.01) |

(52) U.S. Cl.
CPC ............ *G06F 16/532* (2019.01); *G06F 3/048* (2013.01); *G06F 16/438* (2019.01); *G06F 16/48* (2019.01); *G06Q 10/10* (2013.01)

(58) Field of Classification Search
CPC ...... G06F 16/532; G06F 16/438; G06F 3/048; G06F 16/48; G06Q 10/10
See application file for complete search history.

(56) References Cited

U.S. PATENT DOCUMENTS

| 8,151,194 | B1 * | 4/2012 | Chan .................... G06F 3/01 |
| | | | 709/224 |
| 9,430,115 | B1 * | 8/2016 | Yun ...................... G06F 3/048 |
| 10,362,368 | B1 * | 7/2019 | Goetz ................ H04N 21/2353 |
| 2009/0178003 | A1 * | 7/2009 | Fiedler ............... G06Q 30/0601 |
| | | | 715/810 |

(Continued)

*Primary Examiner* — Son T Hoang
(74) *Attorney, Agent, or Firm* — Farjami & Farjami LLP

(57) ABSTRACT

According to one implementation, a system for performing graph-based media content evaluation includes a computing platform having a hardware processor, and a system memory storing a media content evaluation software code and a graph database. The hardware processor is configured to execute the media content evaluation software code to receive a query from a system user, and to identify one or more media content evaluation metrics corresponding to the query. In addition, the hardware processor is configured to execute the media content evaluation software code to search the graph database for a media content data relevant to the one or more media content evaluation metrics, and to retrieve the media content data from the graph database. The hardware processor is further configured to execute the media content evaluation software code to generate a report responsive to the query using the media content data.

17 Claims, 6 Drawing Sheets

(56) References Cited

U.S. PATENT DOCUMENTS

| | | | |
|---|---|---|---|
| 2010/0318537 A1* | 12/2010 | Surendran | G06F 16/22 707/822 |
| 2011/0047013 A1* | 2/2011 | McKenzie, III | G06Q 30/0241 705/14.4 |
| 2012/0246139 A1* | 9/2012 | Rao | G06F 16/951 707/709 |
| 2013/0024891 A1* | 1/2013 | Elend | H04N 21/4516 725/35 |
| 2013/0060711 A1* | 3/2013 | Dachenhaus | G06Q 10/1053 705/321 |
| 2013/0215116 A1* | 8/2013 | Siddique | G06Q 30/0643 345/420 |
| 2013/0331180 A1* | 12/2013 | Heller | A63F 13/35 463/29 |
| 2014/0306987 A1* | 10/2014 | Snibbe | G06Q 50/01 345/619 |
| 2015/0033106 A1* | 1/2015 | Stetson | G06F 16/24566 715/215 |
| 2015/0128162 A1* | 5/2015 | Ionescu | H04N 21/6125 725/14 |
| 2016/0034786 A1* | 2/2016 | Suri | G06K 9/6256 382/159 |
| 2016/0110877 A1* | 4/2016 | Schwartz | G06T 7/20 382/107 |
| 2017/0126772 A1* | 5/2017 | Campbell | G06F 17/212 |
| 2017/0142481 A1* | 5/2017 | Caruana | H04N 21/23418 |
| 2017/0206210 A1* | 7/2017 | Goikhman | H04N 21/23113 |
| 2018/0089541 A1* | 3/2018 | Stoop | G06K 9/66 |
| 2018/0096507 A1* | 4/2018 | Valdivia | G06F 1/163 |
| 2018/0121856 A1* | 5/2018 | Song | G06Q 10/06393 |
| 2018/0174060 A1* | 6/2018 | Velez-Rojas | H04W 4/02 |
| 2018/0189570 A1* | 7/2018 | Paluri | H04L 43/045 |
| 2018/0210954 A1* | 7/2018 | Guegan | G06F 16/3331 |
| 2018/0218011 A1* | 8/2018 | Taycher | G06F 16/24568 |

* cited by examiner

METHOD AND SYSTEM FOR GENERATING A VISUAL REPRESENTATION OF MEDIA CONTENT FOR PERFORMING GRAPH-BASED MEDIA CONTENT EVALUATION

BACKGROUND

The popularity of video as an entertainment medium has resulted in a wide variety of video based media content being produced and made available to consumers. Traditionally, the creative development of such media content has been a largely subjective, instinct driven, process. For example, a creative decision maker may view programming, or read a screenplay or script, and determine that a work is too violent, or insufficiently romantic.

Despite the subjectivity with which creative decisions surrounding the development of media content have historically been made, media experts and screenwriters agree that there do exist core structural elements common to the types engaging storylines that underlie successful movies and television programming. Unfortunately, however, the conventional art lacks a structured and quantitative process for objectively evaluating or comparing distinct works, or to predict the likelihood that a particular work will be a commercial success.

SUMMARY

There are provided systems and methods for graph-based media content evaluation, substantially as shown in and/or described in connection with at least one of the figures, and as set forth more completely in the claims.

DETAILED DESCRIPTION

Figure 1:
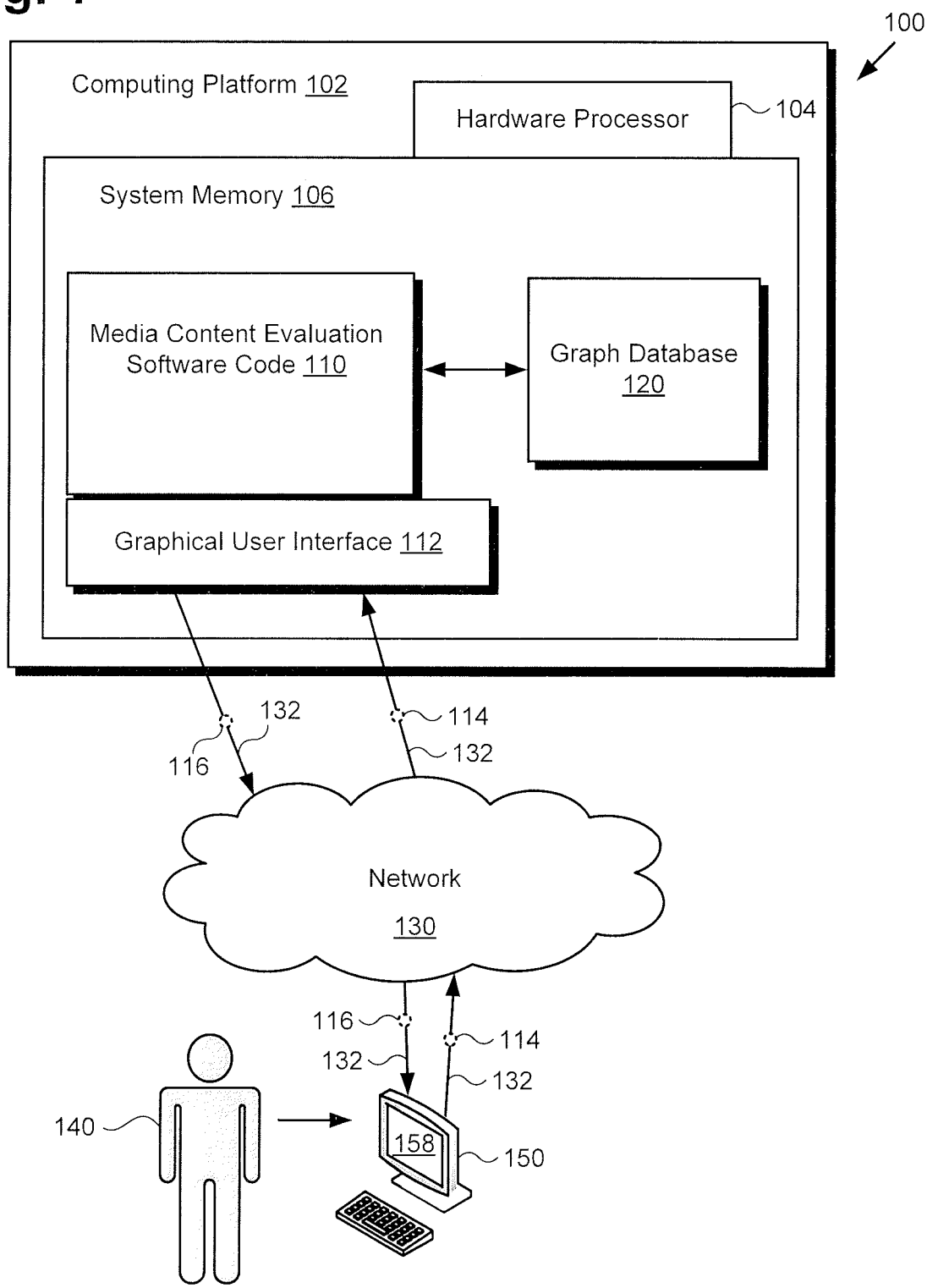
FIG. 1 shows an exemplary system for performing graph-based media content evaluation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, the popularity of video as an entertainment medium has resulted in a wide variety of video based media content being produced and made available to consumers. As further stated above, the creative development of such media content has traditionally been a largely subjective, instinct driven, process. For example, a creative decision maker may view programming, or read a screenplay or script, and determine that a work is too violent, or insufficiently romantic.

Despite the subjectivity with which creative decisions surrounding the development of media content have historically been made, media experts and screenwriters agree that there do exist core structural elements common to the types engaging storylines that underlie successful movies and television programming. Unfortunately, however, the conventional art lacks a structured and quantitative process for objectively evaluating or comparing distinct works, or to predict the likelihood that a particular work will be a commercial success.

The present application discloses systems and methods for graph-based media content evaluation that address and overcome the deficiencies in the conventional art described above. The present media content evaluation solution identifies one or more media content evaluation metrics corresponding to a query regarding a creative work. In addition, the present solution searches a graph database for media content data relevant to the one or more media content evaluation metrics, and retrieves that media content data for use in generating a report corresponding to the creative work and responsive to the query. That report advantageously enables a user to objectively analyze and/or compare different works of media content, thereby enhancing the creative development process and improving the accuracy with which commercially successful media content can be identified.

FIG. 1 shows an exemplary system for performing graph-based media content evaluation, according to one implementation. As shown in FIG. 1, system 100 includes computing platform 102 having hardware processor 104, and system memory 106 implemented as a non-transitory storage device. According to the present exemplary implementation, system memory 106 stores media content evaluation software code 110 providing graphical user interface (GUI) 112, and graph database 120.

As further shown in FIG. 1, system 100 is implemented within a use environment including communication network 130, user device 150 including display 158, and system user 140 utilizing user device 150. Also shown in FIG. 1 are network communication links 132 interactively connecting user device 150 and system 100 via communication network 130, query 114, and report 116 responsive to query 114 and generated using media content evaluation software code 110.

It is noted that although FIG. 1 depicts media content evaluation software code 110, GUI 112, and graph database 120 as commonly residing in memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Thus, it is to be understood that one or more of media content evaluation software code 110, GUI 112, and graph database 120 may be stored remotely from one another and/or may be executed using the distributed processor resources of system 100.

According to the implementation shown by FIG. 1, system user 140 may utilize user device 150 to interact with system 100 over communication network 130. In one such implementation, system 100 may correspond to one or more web servers, accessible over a packet-switched network such as the Internet, for example. Alternatively, system 100 may correspond to one or more computer servers supporting a local area network (LAN), or included in another type of limited distribution network.

Although user device 150 is shown as a personal computer (PC) in FIG. 1, that representation is also provided merely as an example. In other implementations, user device 150 may be any other suitable mobile or stationary computing device or system. For example, in other implementations, user device 150 may take the form of a laptop computer, tablet computer, or smartphone, for example. System user 140 may utilize user device 150 to interact with system 100 and to use media content evaluation software code 110, executed by hardware processor 104, to generate report 116 responsive to query 114.

For example, system user 140 may submit query 114 regarding media content included in graph database 120 to media content evaluation software code 110, via GUI 112. Media content evaluation software code, executed by hardware processor 104, may then search graph database 120 for data and/or metadata relevant to one or more media evaluation metrics corresponding to query 114, and generate report 116 responsive to query 114 using the data and/or metadata retrieved from graph database 120.

For the purposes of the present application, graph database 120 is a non-relational database (NoSQL database) that utilizes graph theory to store and map database entries. In other words, graph database may take the form of a graph-oriented database, as known in the art. According to the exemplary implementation shown in FIG. 1, graph database 120 stores information, i.e., data and metadata describing media content having entries in graph database 120 (that data and/or metadata hereinafter referred to as "media content data"). The media content described by entries in graph database 120 may include video, such as movie content or television (TV) programming content, for example.

In one exemplary implementation, graph database 120 includes multiple nodes corresponding respectively to characters, locations, events, storylines, series of episodic TV programming, broadcast seasons within those series, and individual episodes within broadcast seasons, for example. Each node of graph database 120 corresponds to a set of properties or characteristics, and each node is connected to one or more other nodes by edges, each of which represents a relationship between nodes.

It is also noted that, in various implementations, report 116, when generated by media content evaluation software code 110 using media content data retrieved from graph database 120, may be stored in system memory 106 and/or may be copied to non-volatile storage (not shown in FIG. 1). Alternatively, or in addition, as shown in FIG. 1, in some implementations, report 116 may be sent to user device 150, and may be displayed to system user 140 on display 158 via GUI 112. It is further noted that display 158 may take the form of a liquid crystal display (LCD), a light-emitting diode (LED) display, an organic light-emitting diode (OLED) display, or another suitable display screen that performs a physical transformation of signals to light.

Figure 2:
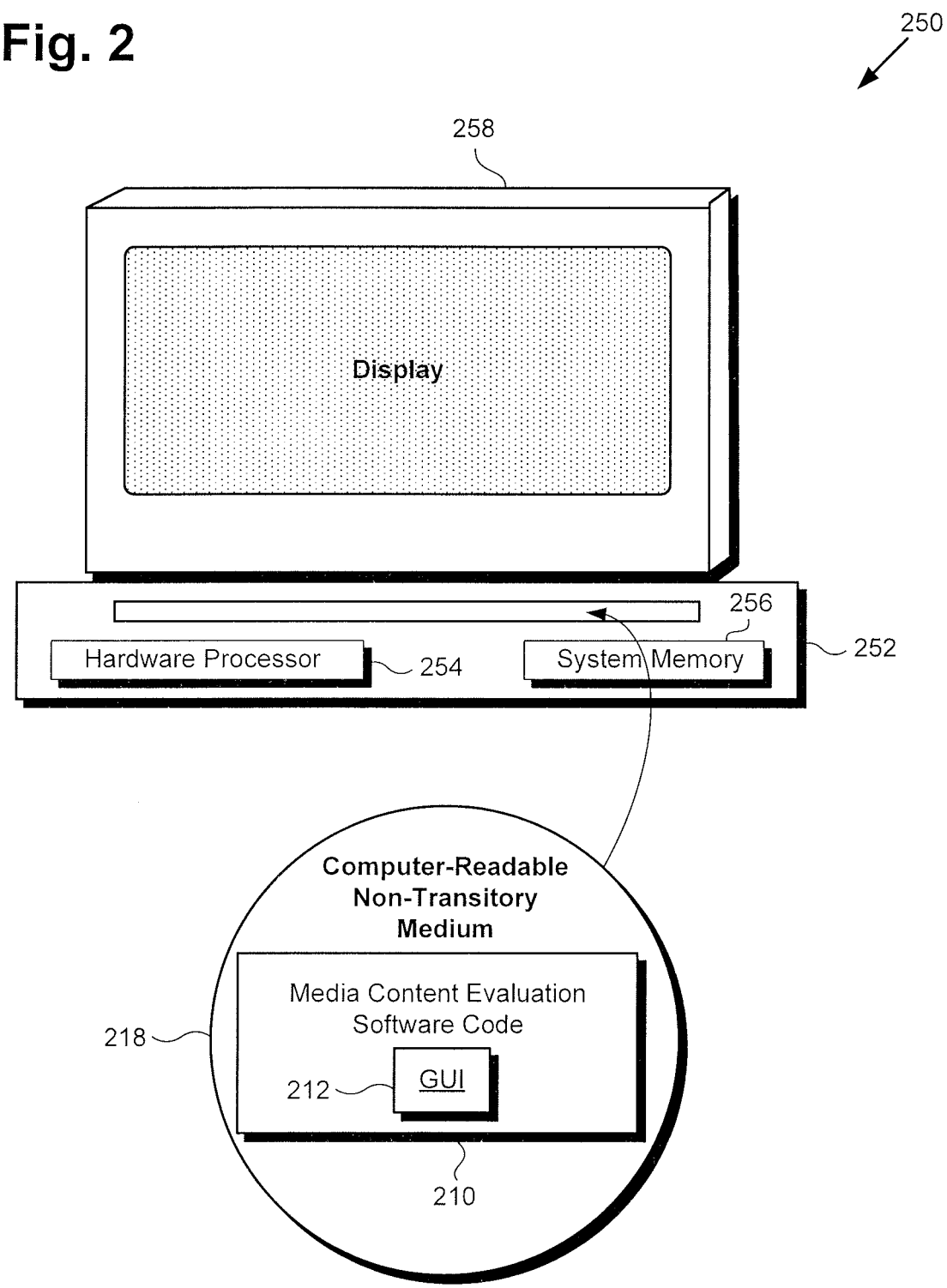
FIG. 2 shows an exemplary system and a computer-readable non-transitory medium including instructions enabling execution of a method for graph-based media content evaluation, according to one implementation.

FIG. 2 shows exemplary system 250 and computer-readable non-transitory medium 218 including instructions for performing graph-based media content evaluation, according to one implementation. System 250 includes computing platform 252 having hardware processor 254 and system memory 256, interactively linked to display 258. Display 258 may take the form of an LCD, LED display, an OLED display, or another suitable display screen that performs a physical transformation of signals to light. System 250 including computing platform 252 having hardware processor 254 and system memory 256 corresponds in general to system 100 including computing platform 102 having hardware processor 104 and system memory 106, in FIG. 1. Consequently, system 250 may share any of the characteristics attributed to corresponding system 100 by the present disclosure.

Also shown in FIG. 2 is computer-readable non-transitory medium 218 having media content evaluation software code 210 providing GUI 212 stored thereon. The expression "computer-readable non-transitory medium," as used in the present application, refers to any medium, excluding a carrier wave or other transitory signal, that provides instructions to hardware processor 254 of computing platform 252. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 2, computer-readable non-transitory medium 218 provides media content evaluation software code 210 for execution by hardware processor 254 of computing platform 252. Media content evaluation software code 210 and GUI 212 correspond in general to media content evaluation software code 110 and GUI 112, in FIG. 1, and are capable of performing all of the operations attributed to those corresponding features by the present disclosure. That is to say media content evaluation software code 210 may receive query 114 from system user 140 via GUI 212, may search for and retrieve media content data from graph database 120, and may generate report 116 responsive to query 114 using the media content data. Moreover, in some implementations, system 250 may display report 116 to system user 140 using display 258 and GUI 212.

Figure 3:
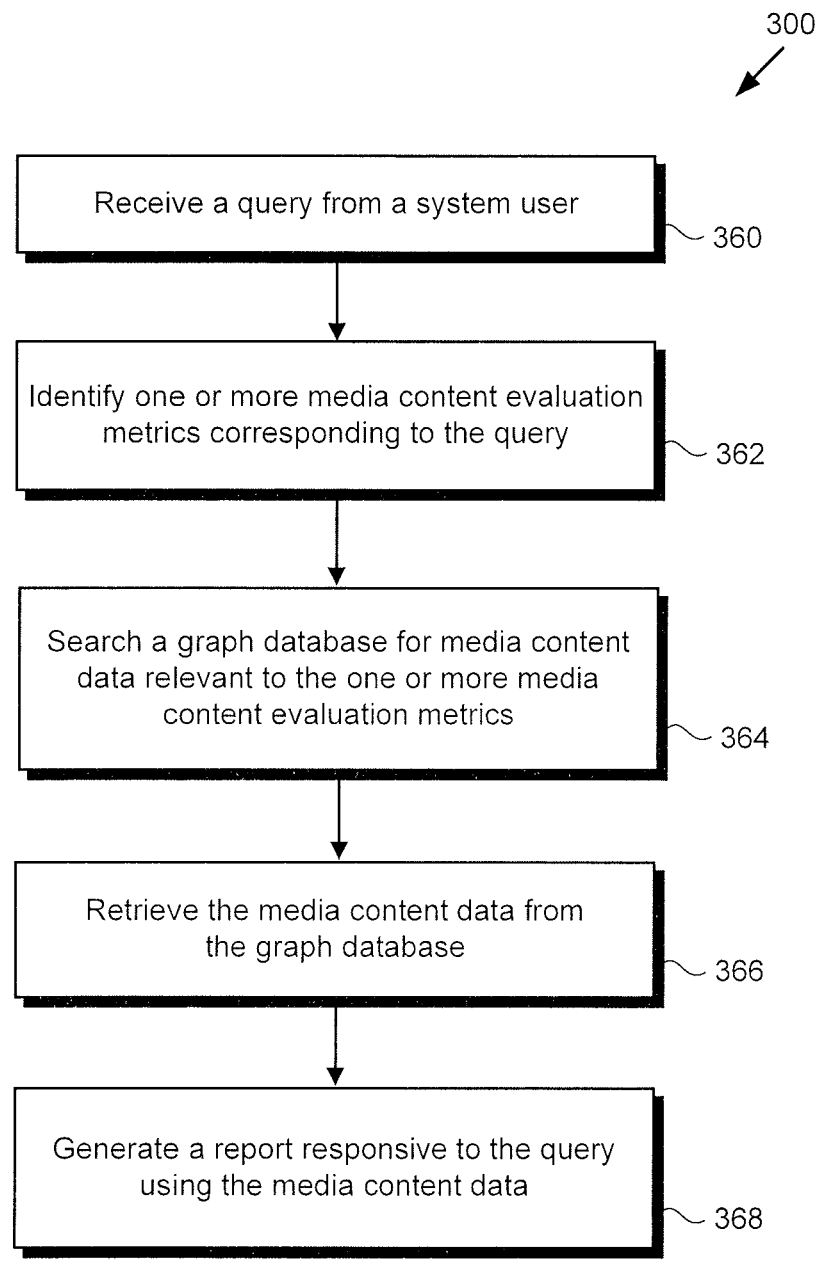
FIG. 3 shows a flowchart presenting an exemplary method for graph-based media content evaluation, according to one implementation.

The functionality of media content evaluation software code 110/210 will be further described by reference to FIG. 3 in combination with FIGS. 1, 2, 4, 5, and 6. FIG. 3 shows flowchart 300 presenting an exemplary method for use by a system, such as system 100, in FIG. 1, or system 250, in FIG. 2, to perform graph-based media content evaluation. With respect to the method outlined in FIG. 3, it is noted that certain details and features have been left out of flowchart 300 in order not to obscure the discussion of the inventive features in the present application.

Figure 4:
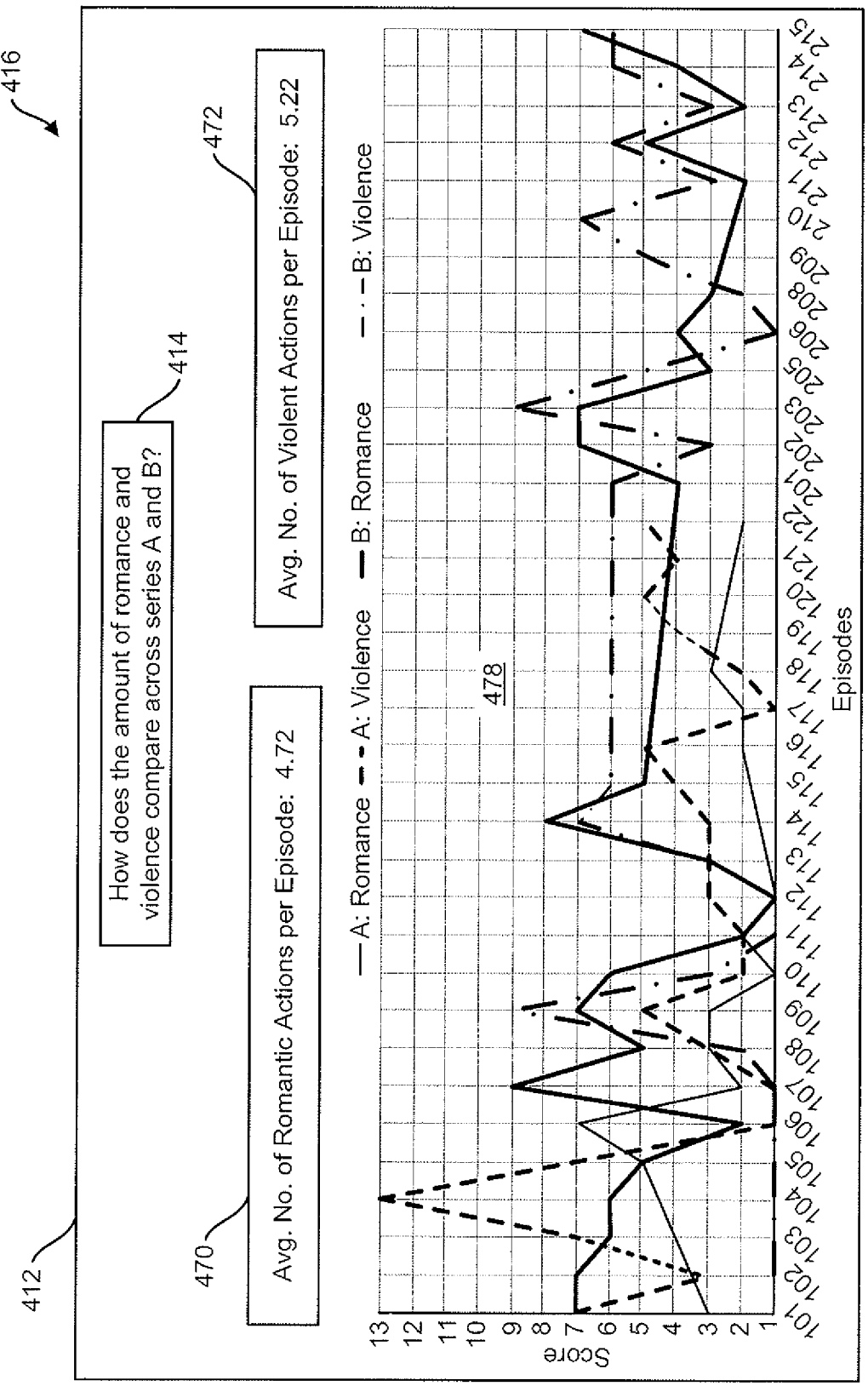
FIG. 4 shows an exemplary report including a visual representation of media content generated by a system for performing graph-based media content evaluation, according to one implementation.
Figure 5:
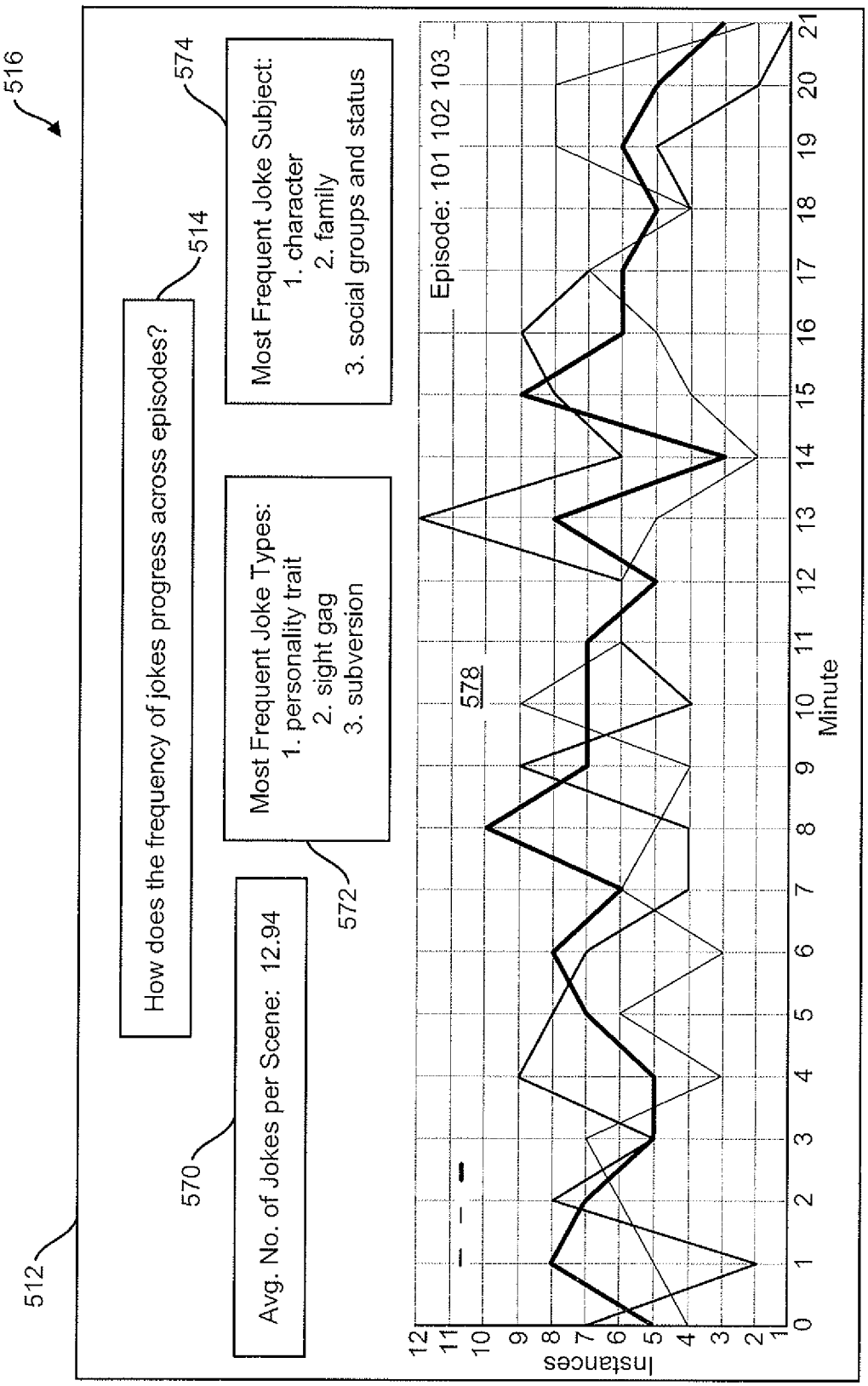
FIG. 5 shows another exemplary report including a visual representation of media content generated by a system for performing graph-based media content evaluation, according to one implementation.
Figure 6:
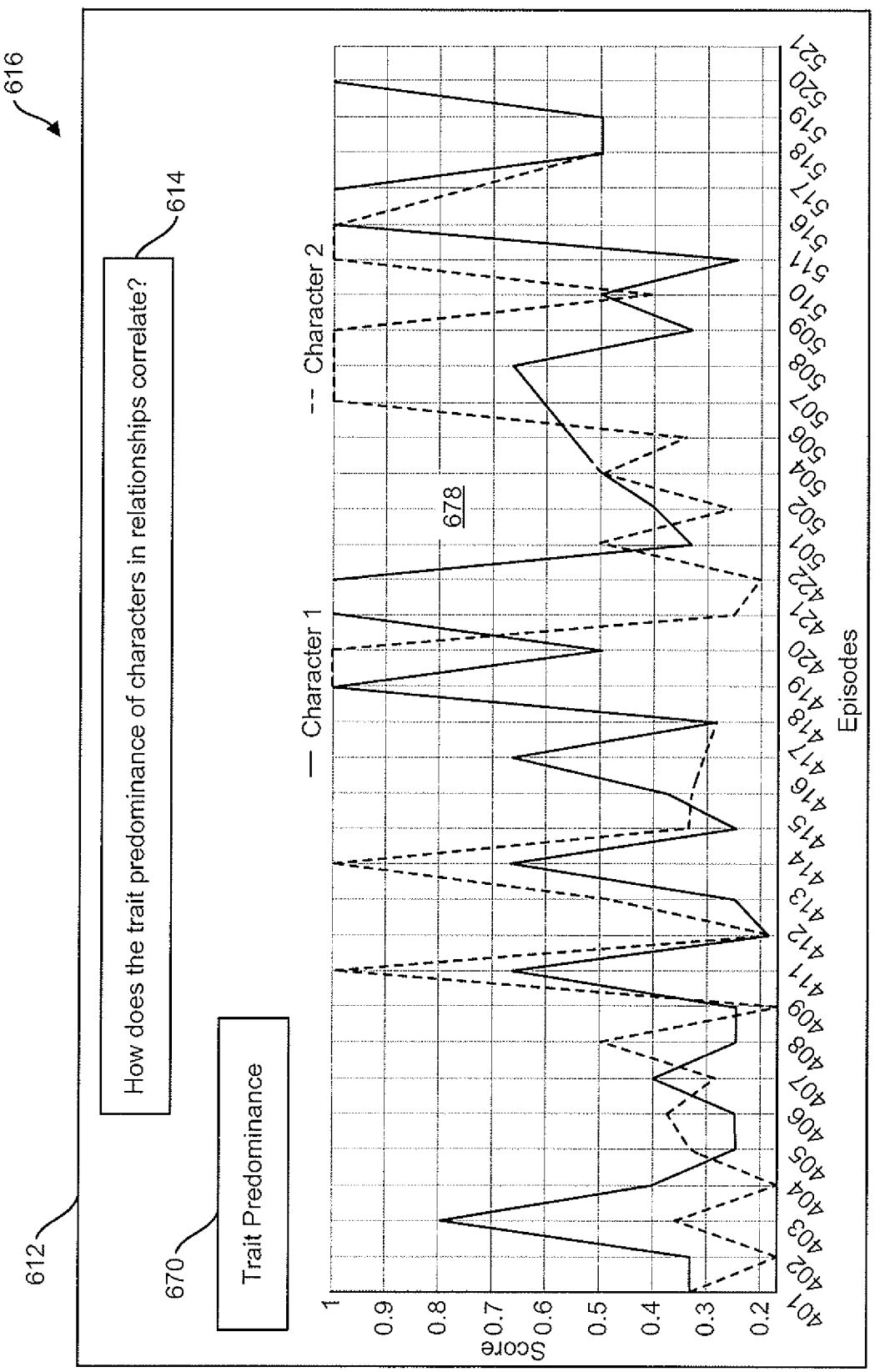
FIG. 6 shows yet another exemplary report including a visual representation of media content generated by a system for performing graph-based media content evaluation, according to one implementation.

FIGS. 4, 5, and 6 show exemplary reports 416, 516, 616 including visual representations responsive to respective queries 414, 514, 614 from system user 140 regarding media content corresponding to media content data stored in graph database 120. For example, in FIG. 4, report 416 is displayed via GUI 412, and includes media content evaluation metrics 470 and 472, as well as visual representation 478 in the form of a graph of media content evaluation metrics 470 and 472. Analogously, report 516, in FIG. 5, is displayed via GUI 512, and includes media content evaluation metrics 570, 572, and 574, as well as visual representation 578 in the form of a graph of media content evaluation metric 570, while report 616, in FIG. 6, is displayed via GUI 612, and includes visual representation 678 in the form of a graph of media content evaluation metric 670.

It is noted that GUI 412/512/612, in FIGS. 4/5/6, corresponds in general to GUI 112/212, in FIG. 1/2, and those corresponding features may share the characteristics attributed to any corresponding feature by the present disclosure. Moreover, query 415/514/614 and report 416/516/616 correspond respectively in general to query 114 and report 116, in FIG. 1, and those corresponding features may share the characteristics attributed to any corresponding feature by the present disclosure.

Referring now to FIG. 3 in combination with FIGS. 1, 2, 4, 5, and 6, flowchart 300 begins with receiving query 114/414/514/614 from system user 140 (action 360). By way of example, system user 140 may utilize user device 150 to interact with system 100, or may interact directly with system 250, in order to submit query 114/414/514/614. As shown by FIG. 1, in one implementation, system user 140 may do so by transmitting query 114/414/514/614 from user device 150 to system 100 via communication network 130 and network communication links 132. Query 114/414/514/ 614 may be received by system 100/250, using media content evaluation software code 110/210 executed by hardware processor 104/254.

Moreover, according to the implementations shown by FIGS. 1, 2, 4, 5, and 6, query 114/414/514/614 may be submitted to system 100/250 by system user 140 as an input to GUI 112/212/412/512/612. That is to say, in some implementations, hardware processor 104/254 may execute media content evaluation software code 110/210 to provide GUI 112/212/412/512/612, and query 114/414/514/614 may be received from system user 140 via GUI 112/212/412/512/ 612.

Query 114/414/514/614, may have as its subject, video, such as TV programming content or movie content, for example. In use cases in which the subject of query 114/ 414/514/614 is TV programming content, for example, query 114/414/514/614 may take any of many forms. Referring to FIG. 4, for instance, query 414 requests a comparison of two different TV series with respect to the prevalence of romantic and violent actions. By contrast, query 514, in FIG. 5, inquires regarding the frequency of jokes across episodes of a single series.

As yet another example, query 614, in FIG. 6, seeks to compare the trait predominance of two characters involved in a relationship within the context of a TV series, across episodes of that series. It is noted, that as used in the present application, "trait predominance" refers to how often a character displays his or her primary character trait within an episode. Trait predominance values may be normalized so as to range from zero to one, for example. A high trait predominance means a character is more one-dimensional, since they display their primary character trait most of the time in a particular episode. A low trait predominance means a character displays a greater diversity of character traits, and is therefore more varied or multi-dimensional in a particular episode.

Flowchart 300 continues with identifying one or more media content evaluation metrics corresponding to query 114/414/514/614 (action 362). Continuing to refer to the exemplary use case described above, in which the subject of query 114/414/514/614 is TV programming content, the media content evaluation metric or metrics corresponding to query 114/414/514/614 may also assume a variety of forms. In FIG. 4, for instance, media content evaluation metrics 470 and 472 are identified as corresponding to query 414 requesting comparison of series "A" and series "B" with respect to the prevalence of romantic and violent actions. Media content evaluation metric 470 reveals the average number of romantic actions per episode, while media content evaluation metric 472 reveals the average number of violent actions per episode.

However, in FIG. 5, media content evaluation metrics 570, 572, and 574 are identified as corresponding to query 514 inquiring with respect to the frequency of jokes across episodes of the same series. Media content evaluation metric 570 reveals the average number of jokes per scene in each episode of the series. Media content evaluation metric 572 describes the three most frequent joke types, while media content evaluation metric 574 describes the three most frequent joke subjects.

Referring to FIG. 6, single media content evaluation metric 670 measuring trait predominance is identified as corresponding to query 614. Identification of one or more media content evaluation metrics 470/472/570/572/574/670 corresponding to query 114/414/514/614 may be performed by system 100/250, using media content evaluation software code 110/210 executed by hardware processor 104/254.

Flowchart 300 continues with searching graph database 120 for media content data relevant to one or more media content evaluation metrics 470/472/570/572/574/670 (action 364). As noted above, the media content data stored in graph database 120 may include data and/or metadata describing features of media content having entries in graph database 120. Searching of graph database 120 for media content data relevant to one or more media content evaluation metrics 470/472/570/572/574/670 may be performed by system 100/250, using media content evaluation software code 110/210 executed by hardware processor 104/254.

Flowchart 300 continues with retrieving the media content data located through the search performed in action 364 from graph database 120 (action 366). As noted above, in exemplary implementations in which media content having entries in graph database 120 takes the form of TV programming content, graph database 120 can include multiple nodes corresponding respectively to characters, locations, events, storylines, series of episodic TV programming, broadcast seasons within those series, and individual episodes within broadcast seasons.

As further noted above, each node of graph database 120 corresponds to a set of properties or characteristics, and each node is connected to one or more other nodes by edges, each of which represents a relationship between nodes. Consequently, the media content data retrieved from graph database 120 in action 366 can include any of those properties and/or relationships. Retrieval of the media content data from graph database 120 may be performed by system 100/250, using media content evaluation software code 110/210 executed by hardware processor 104/254.

Flowchart 300 can conclude with generating a report responsive to query 114/414/514/614 (action 368). Referring to FIG. 4, for example, report 416 responsive to query 414 includes descriptions of media content evaluation metrics 470 and 472, as well as visual representation 478 in the form of a graph of both media content evaluation metric 470 and media content evaluation metric 472.

In FIG. 5, report 516 responsive to query 514 includes descriptions of media content evaluation metrics 570, 572, and 574, as well as visual representation 578. However, in contrast to visual representation 478, in FIG. 4, visual representation 578 includes a graph of only single media content evaluation metric 570 revealing the average number of jokes per scene across various episodes of a TV series. Similarly, report 616 responsive to query 614, in FIG. 6, includes a description of media content evaluation metric 670 and visual representation 678 in form of a graph of that sole metric for two characters involved in a relationship, across multiple episodes of a TV series.

Report 116/416/516/616 responsive to query 114/414/514/614 may be generated by system 100/250, using media content evaluation software code 110/210 executed by hardware processor 104/254. Moreover, according to the implementations shown by FIGS. 1, 2, 4, 5, and 6, report 116/416/516/616 may be displayed to system user 140 via GUI 112/212/412/512/612.

In addition to, or as an alternative to, the visual representations included in report 116/416/516/616 and discussed above, the present inventive principles extend to other analytical applications for the media content data retrieved from graph database 120. For example, in one implementation, some or all of media content evaluation metrics 470/472/570/572/574/670 may be combined into predictive models, which can be utilized to discover patterns that might not be apparent from a visual representation of those metrics. A specific example of such an implementation is utilizing media content data including (1) historical performance data and (2) creative attribute data of pilot episodes of television content in order to train a predictive model that would project the success of new pilots for which only creative attribute data, but not historical performance data, is available.

Another alternative application for the media content data retrieved from graph database 120 is in the area of new product development. In one such implementation, new advertising products may be created by combining some or all of media content evaluation metrics 470/472/570/572/574/670 with digital viewership information to segment audiences based on the creative properties of the media content those audience segments watch, and using that information to programmatically sell and deliver optimized advertising inventory.

It is noted that some of the applications for the media content data retrieved from graph database 120 may not require the participation of a human decision maker. In those implementations, for example, models or processes that discover patterns through the use of analytics may be designed to make determinations, and in some instances to programmatically take actions based on those determinations, without human intervention.

Thus, present application discloses systems and methods for graph-based media content evaluation. Those media content evaluation solutions identify one or more media content evaluation metrics corresponding to a query regarding a creative work. In addition, those solutions search a graph database for media content data relevant to the one or more media content evaluation metrics, and retrieve that media content data for use in generating a report corresponding to the creative work and responsive to the query. Such a report advantageously enables a user to objectively analyze and/or compare different works of media content, thereby enhancing the creative development process and improving the accuracy with which commercially successful media content can be identified.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a system memory;
the system memory storing a video content evaluation software code and a graph database including entries describing a plurality of video contents having storylines with characters, the graph database including a plurality of nodes having character nodes corresponding to the characters;
the hardware processor configured to execute the video content evaluation software code to:
receive a query from a system user about a first video content of the plurality of video contents, wherein the query inquires about a first character of the characters in the first video content;
identify at least one video content evaluation metric measuring a trait corresponding to the first character;
search the graph database for a video content data relevant to the at least one video content evaluation metric measuring the trait corresponding to the first character;
retrieve the video content data from the graph database, wherein the retrieved video content data includes data relating to the first character in the first video content retrieved from the plurality of nodes of the graph database; and
generate a report responsive to the query and using the retrieved video content data, the report including a graphical representation of the retrieved video content data relating to the first character across a time period of the first video content, the graphical representation including a score for the at least one video content evaluation metric measuring the trait corresponding to the first character at each of a plurality of time intervals of the time period, wherein the score included in the graphical representation is generated using the retrieved video content data from the graph database.

2. The system of claim 1, wherein the hardware processor is further configured to execute the video content evaluation software code to provide a graphical user interface (GUI), and wherein the query is received from the system user via the GUI.

3. The system of claim 2, wherein the GUI is configured to display the report to the system user.

4. The system of claim 1, wherein the graphical representation comprises a graph of the at least one video content evaluation metric measuring the trait corresponding to the first character across a plurality of episodes of the first video content.

5. The system of claim 1, wherein the first video content comprises television programming content.

6. The system of claim 1, wherein the plurality of video contents having the storylines with locations and events, and wherein the plurality of nodes further have location nodes and event nodes corresponding to the locations and the events, respectively.

7. A method for use by a system including a computing platform having a hardware processor and a system memory storing a video content evaluation software code and a graph database including entries describing a plurality of video contents having storylines with characters, the graph database including a plurality of nodes having character nodes, the method comprising:
   receiving, using the hardware processor, a query from a system user about a first video content of the plurality of video contents, wherein the query inquires about a first character of the characters in the first video content;
   identifying, using the hardware processor, at least one video content evaluation metric measuring a trait corresponding to the first character;
   searching, using the hardware processor, the graph database for video content data relevant to the at least one video content evaluation metric measuring the trait corresponding to the first character;
   retrieving, using the hardware processor, the video content data from the graph database, wherein the retrieved video content data includes data relating to the first character in the first video content retrieved from the plurality of nodes of the graph database; and
   generating, using the hardware processor, a report responsive to the query and using the retrieved video content data, the report including a graphical representation of the retrieved video content data relating to the first character across a time period of the first video content, the graphical representation including a score for the at least one video content evaluation metric measuring the trait corresponding to the first character at each of a plurality of time intervals of the time period, wherein the score included in the graphical representation is generated using the retrieved video content data from the graph database.

8. The method of claim 7, further comprising providing, using the hardware processor, a graphical user interface (GUI), wherein the query is received from the system user via the GUI.

9. The method of claim 8, further comprising displaying, using the hardware processor, the report to the system user via the GUI.

10. The method of claim 7, wherein the graphical representation comprises a graph of the at least one video content evaluation metric measuring the trait corresponding to the first character across a plurality of episodes of the first video content.

11. The method of claim 7, wherein the first video content comprises television programming content.

12. The method of claim 7, wherein the plurality of video contents having the storylines with locations and events, and wherein the plurality of nodes further have location nodes and event nodes corresponding to the locations and the events, respectively.

13. A computer-readable non-transitory medium having stored thereon instructions and a graph database including entries describing a plurality of video contents having storylines with characters, the graph database including a plurality of nodes having character nodes, wherein execution of the instructions by a hardware processor instantiates a method comprising:
   receiving a query from a system user about a first video content of the plurality of video contents, wherein the query inquires about a first character in the first video content;
   identifying at least one video content evaluation metric measuring a trait corresponding to the first character;
   searching the graph database for a video content data relevant to the at least one video content evaluation metric measuring the trait corresponding to the first character;
   retrieving the video content data from the graph database, wherein the retrieved video content data includes data relating to the first character in the first video content retrieved from the plurality of nodes of the graph database; and
   generating a report responsive to the query and using the retrieved video content data, the report including a graphical representation of the retrieved video content data relating to the first character across a time period of the first video content, the graphical representation including a score for the at least one video content evaluation metric measuring the trait corresponding to the first character at each of a plurality of time intervals of the time period, wherein the score included in the graphical representation is generated using the retrieved video content data from the graph database.

14. The computer-readable non-transitory medium of claim 13, wherein execution of the instructions by the hardware processor instantiates the method further comprising providing a graphical user interface (GUI), wherein the query is received from the system user via the GUI.

15. The computer-readable non-transitory medium of claim 14, wherein execution of the instructions by the hardware processor instantiates the method further comprising displaying, using the hardware processor, the report to the system user via the GUI.

16. The computer-readable non-transitory medium of claim 13, wherein the graphical representation comprises a graph of the at least one video content evaluation metric measuring the trait corresponding to the first character across a plurality of episodes of the first video content.

17. The computer-readable non-transitory medium of claim 13, wherein the first video content comprises television programming content.

* * * * *